United States Patent
Ichikawa et al.

(10) Patent No.: US 7,969,292 B2
(45) Date of Patent: Jun. 28, 2011

(54) TIRE AIR PRESSURE MEASURING APPARATUS WHICH REDUCES THE PROBABILITY OF FALSE WARNINGS

(75) Inventors: Hiromitsu Ichikawa, Tokyo (JP); Toshihiro Miyazaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 467 days.

(21) Appl. No.: 12/091,014

(22) PCT Filed: Oct. 16, 2006

(86) PCT No.: PCT/JP2006/320530
§ 371 (c)(1),
(2), (4) Date: Jun. 18, 2008

(87) PCT Pub. No.: WO2007/046313
PCT Pub. Date: Apr. 26, 2007

(65) Prior Publication Data
US 2010/0066522 A1 Mar. 18, 2010

(30) Foreign Application Priority Data
Oct. 20, 2005 (JP) .................... 2005-306296

(51) Int. Cl.
*G08B 21/00* (2006.01)

(52) U.S. Cl. .................... 340/442; 73/146.5

(58) Field of Classification Search .......... 340/442–448; 73/146.2
See application file for complete search history.

(56) References Cited

U.S. PATENT DOCUMENTS 7,032,441 B2 * 4/2006 Kanatani et al. ............. 73/146

FOREIGN PATENT DOCUMENTS

| JP | 2001-055026 | 2/2001 |
| JP | 2001-105811 | 4/2001 |
| JP | 2002-248913 | 9/2002 |
| JP | 2003-154825 | 5/2003 |
| JP | 2003-237327 | 8/2003 |
| JP | 2003-306017 | 10/2003 |
| JP | 2005-104410 | 4/2005 |
| JP | 2005-515107 | 5/2005 |
| JP | 2005-162118 | 6/2005 |
| JP | 2005-170133 | 6/2005 |
| WO | 03-059658 | 7/2003 |

OTHER PUBLICATIONS

Australian Office Action dated Aug. 21, 2009, citing JP 2005-104410 (previously submitted).

* cited by examiner

*Primary Examiner* — Jeffery Hofsass
(74) *Attorney, Agent, or Firm* — Sughrue Mion, PLLC

(57) ABSTRACT

A tire pressure measuring apparatus provides a warning of an error of a tire air pressure measuring module only when it is not that determined a vehicle stops and also any on of receivers has not received an air pressure data signal for an error determining duration. Therefore, a probability of a false warning can be reduced.

4 Claims, 8 Drawing Sheets

TIRE AIR PRESSURE MEASURING APPARATUS WHICH REDUCES THE PROBABILITY OF FALSE WARNINGS

TECHNICAL FIELD

The present invention relates to a tire air pressure measuring apparatus provided in a vehicle for measuring air pressure in a tire.

BACKGROUND ART

Heretofore, a tire pressure measuring apparatus provided in a vehicle for measuring tire pressure has been known (for example, Patent Document 1). A conventional tire air pressure measuring apparatus includes air pressure sensor modules, a receiver, an ECU and a display unit.

Each of the air pressure sensor modules is provided with a tire and measures a tire air pressure to generate an air pressure data signal of the measured air pressure. Each of the air pressure sensor modules generates an identification data signal for identifying itself among the air pressure sensor modules. Each of the air pressure sensor modules transmits the air pressure data signal and the identification data signal to the receiver at predetermined transmitting intervals (for example, 1 (min.)) by wireless communicating with the receiver at the predetermined transmitting intervals. Each of the air pressure sensor modules rotates together with the tire.

The receiver communicates wirelessly with the air pressure sensor modules. The receiver receives the air pressure data signals and the identification data signals, and outputs them to the ECU. The ECU classifies each of the air pressure data signals into each of segments provided for the tires based on the signals transmitted from the receiver and identifies the air pressure of each of the tires based on the air pressure data signal in each of the segments to display it on the display unit. In case where the receiver has not received the air pressure data signal of any one of the segments for an error determining duration, the ECU determines that an error has occurred in the air pressure sensor module of the one of the segments and displays the determination on the display unit. Here, the error determining duration is equal to or longer than the predetermined transmitting interval and may be 60 (min.) for example.

Patent Document 1: Japanese Patent Application Laid-Open NO. 2003-237327

DISCLOSURE OF THE INVENTION

However, since each of the air pressure modules rotates together with the tire, its position must change while the vehicle is running and then becomes immobile while the vehicle stops. Since each of the air pressure modules communicates wirelessly with the receiver, the air pressure data signal transmitted from the air pressure sensor module may not be sometimes transmitted to the receiver depending on the position of the air pressure sensor module.

Therefore, if the vehicle stops for the error determining duration under the situation where the air pressure data signals transmitted from the air pressure sensor module cannot be transmitted to the receiver, the receiver cannot receive the air pressure data signal even when the air pressure sensor module has sent the air pressure data signal. As a result, the ECU determines that an error has occurred in that air pressure sensor module and displays the determination on the display unit.

In this manner, according to the conventional tire air pressure measuring apparatus, a warning of an error in an air pressure sensor module may be sometimes issued even if the air pressure sensor module is normal.

The present invention is made for overcome the above-mentioned problem and its purpose is to provide an air pressure measuring apparatus that can reduce a probability of a false warning of an error in an air pressure sensor module.

To achieve the propose, the invention of the present application includes a tire air pressure measuring unit which rotates together with tires of a vehicle and sends an air pressure data signal on an air pressure of the tires at predetermined transmitting intervals; a receiver unit for receiving the air pressure data signal; a vehicle-stop judgment unit which determined that the vehicle stops only when a predetermined vehicle-stop condition is met; and a warning unit which provides a warning of an error of the tire air pressure measuring unit only when it is not determined that the vehicle stops and also the receiver unit has not received the air pressure data signal for an error determining duration which is longer than the transmitting interval. Then, the tire air pressure measuring unit and the receiver unit transmit signals wirelessly.

BEST MODE(S) FOR CARRYING OUT THE INVENTION

First Embodiment

Figure 1:
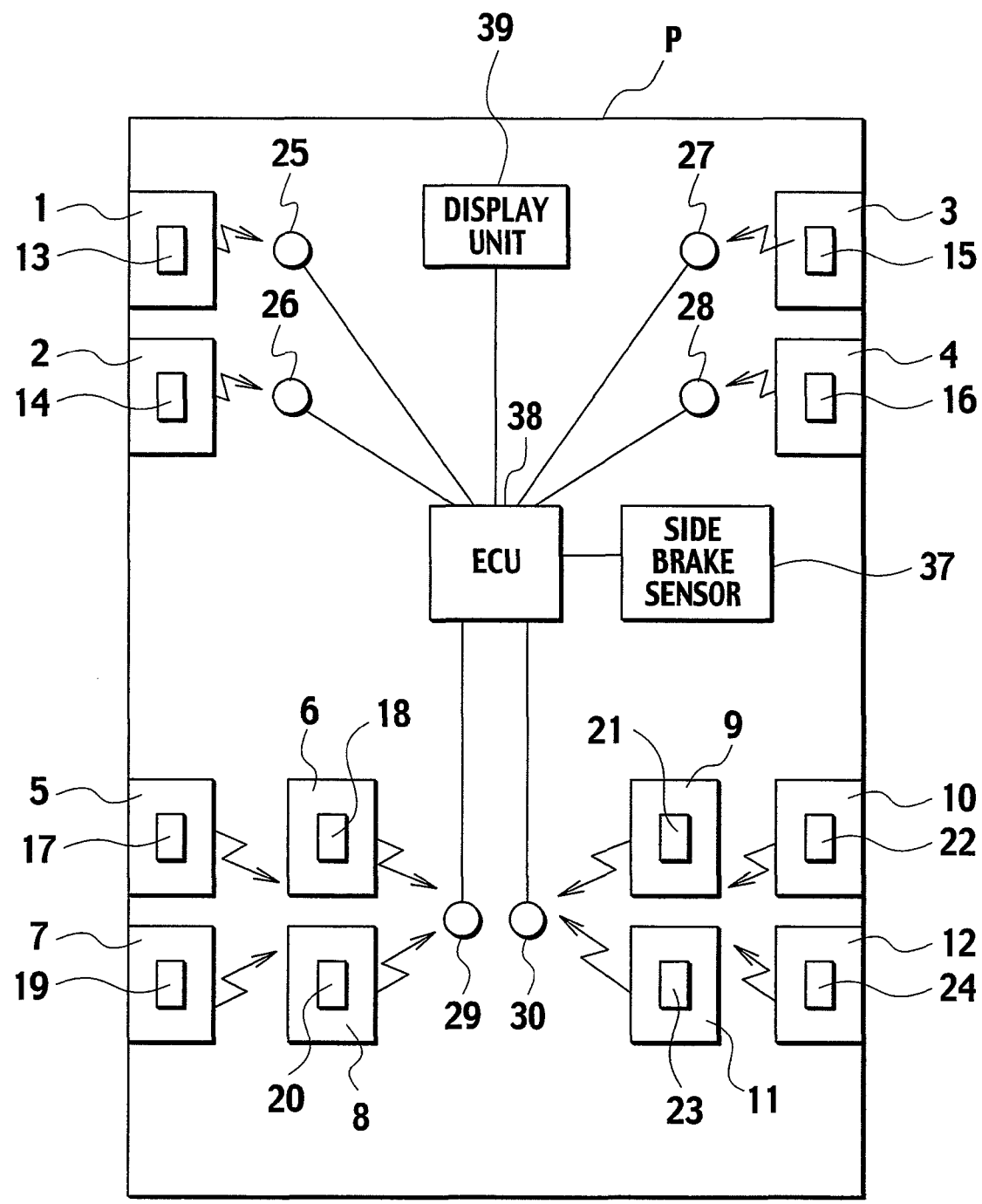
FIG. 1 is a schematic plan view showing a tire air pressure measuring apparatus according to an embodiment of the present invention.

Hereinafter, a first embodiment according to the present invention will be explained with reference to drawings. FIG. 1 is a schematic plan view showing a configuration of a tire air pressure measuring apparatus in the first embodiment. The tire air pressure measuring apparatus is installed in a vehicle P. The vehicle P includes twelve tires 1 to 12.

The tire air pressure measuring apparatus includes air pressure sensor modules 13 to 24, an electronic control unit (hereinafter, it is mentioned as an "ECU") 38 and a display unit 39.

The air pressure sensor modules 13 to 24 are provided correspondently with the tires 1 to 12. Specifically, when a numeral "n" (any one of integers within n=1 to 12) is allocated to a tire, a numeral (n+12) will be allocated to an air pressure sensor module corresponding to the tire "n". The receivers 25 to 30 are provided correspondently with the air pressure sensor modules 13 to 24. Specifically, when a numeral "m" (any one of integers within m=13 to 16) is allocated to an air pressure sensor module, a numeral (m+12) will be allocated to a receiver corresponding to the air pressure sensor module "m". The receiver 29 is correspondent with the air pressure sensor modules 17 to 20 and the receiver 30 is correspondent with the air pressure sensor modules 21 to 24.

The air pressure sensor module 13 measures an air pressure of the tire 1 corresponding to the air pressure sensor module 13 and generates an air pressure data signal of the measured air pressure. The air pressure sensor module 13 generates an identification data signal for differentiating itself from other air pressure sensor modules 14 to 24. The air pressure sensor module 13 sends the air pressure data signal and the identification data signal to the receiver 25 at predetermined transmitting intervals by wireless-communicating with the receiver 25 corresponding to the air pressure sensor module 13 at the predetermined transmitting intervals. The air pressure sensor module 13 rotates together with the tire 1.

The air pressure sensor modules 14 to 24 measure air pressures of the tires 2 to 12 and sends the air pressure data signals and the identification data signals to the receivers 26 to 30 by executing identical processes as that of the air pressure sensor module 13. The air pressure sensor modules 14 to 24 rotate together with the tires.

The receivers 25 to 30 receive the air pressure data signals and the identification data signals by wireless communicating with the air pressure sensor modules 13 to 24 and output them to the ECU 38.

A side brake sensor 37 detects whether or not a side brake is being pulled. The side brake sensor 37 outputs a side-brake-on signal to the ECU 38 when the side brake is being pulled and outputs a side-brake-off signal to the ECU 38 when the side brake is not being pulled. Note that the signal output from the side brake sensor 37 will be used in a third embodiment. Therefore, the side brake sensor 37 is not essential in the first embodiment and in a second embodiment.

The ECU 38 is configured with a CPU (central processing unit), a ROM (read-only memory), a RAM (random access memory) and so on. The ECU 38 sets segments per the tires 1 to 12 and provides memory areas in the RAM per the segments. The ECU 38 classifies the air pressure data signals into the segments set per the tires 1 to 12 based on the signals supplied from the receivers 25 to 30. The ECU 38 specifies the memory areas based on the segments to which the air pressure data signals belong. The ECU 38 stores contents of the air pressure data signals, i.e. the air pressure data in the specified memory areas, respectively.

The ECU 38 measures each strength of the air pressure data signals (received signal strength) and generates received signal strength data of the measured received signal strength. Here, the value of the received signal strength takes a real number within 1 to 100 for example. The ECU 38 stores the received signal strength data in the specified memory area for each of the air pressure data signals, respectively. The ECU 38 recognizes the air pressures of the tires 1 to 12 based on the air pressure data stored in the memory areas and the segments to which the air pressure data belong, and displays the results of the recognition on the display unit 39.

The ECU 38 judges a vehicle-stop condition, in which the received signal strength data stay constant continuously for an error determining duration in the segments equal-to or more-than a predetermined segment criteria number (for example, five). As a result, the ECU 38 determines that the vehicle P stops only when the vehicle stop condition has been met. The ECU 38 sets a stop flag "k" to "1" when it is determined that the vehicle P stops or sets the stop flag "k" to "0" when it is not determined that the vehicle P stops. Note that an initial value of the stop flag "k" is "0". If the stop flag "k" is set to "0" and an air pressure data signal belonging to any one of the segments is not supplied for the error determining duration, the ECU 38 displays a warning of an error in the air pressure sensor module corresponding to the one of the segments on the display unit 39. On the contrary, if the stop flag "k" is set to "1", the ECU 38 doesn't display the warning even when an air pressure data signal belonging to any one of the segments is not supplied for the error determining duration. In this case, it is considered that the vehicle P stops in a state where an air pressure data signal sent from any one of the air pressure modules cannot be transmitted to the receiver. The display unit 39 displays the air pressure data and the warning under the control by the ECU 38.

Next, processes executed by the tire air pressure measuring apparatus will be explained with reference to FIGS. 2 and 3.

Figure 2:
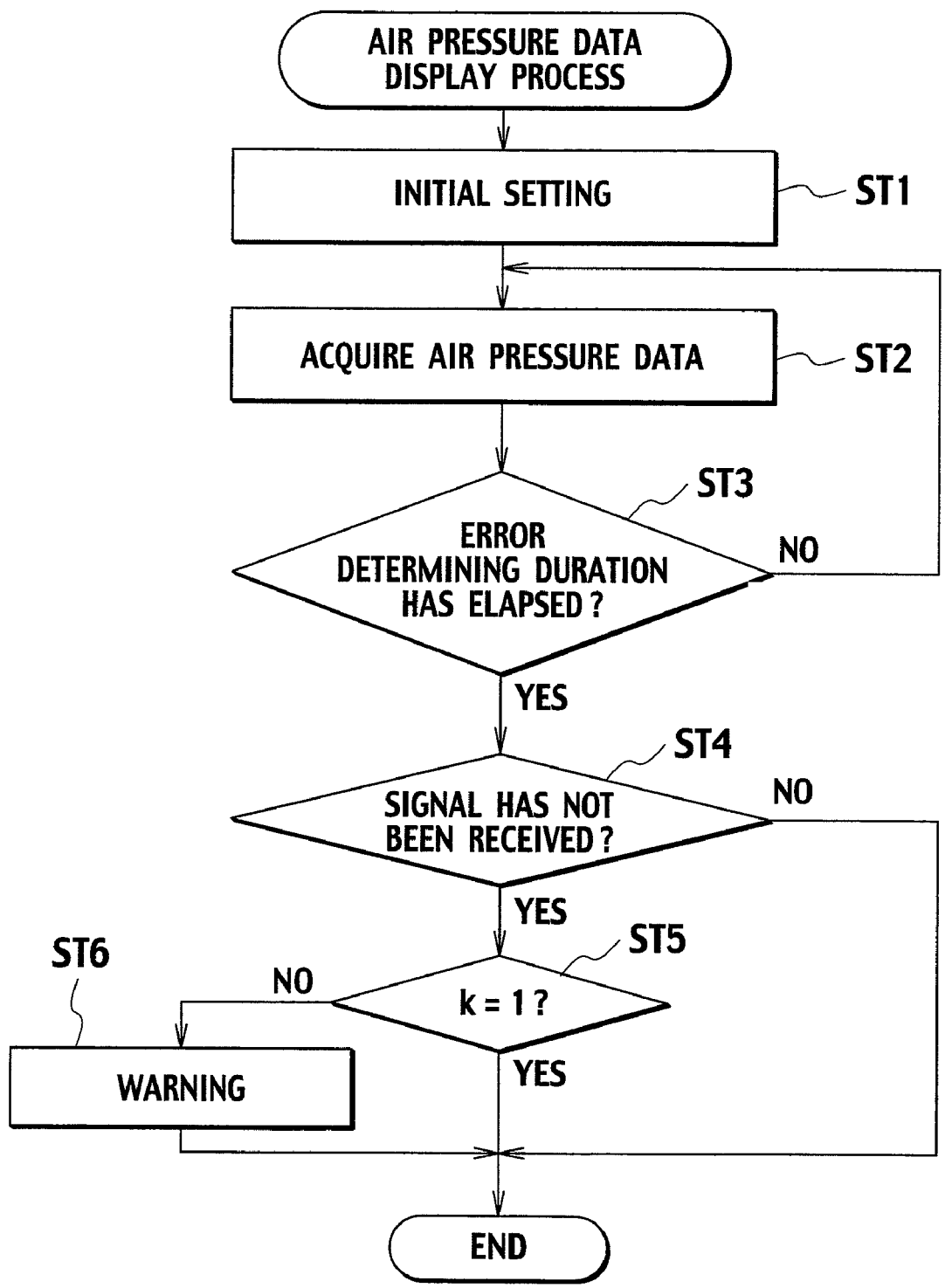
FIG. 2 is a flow-chart showing an example of process by the tire air pressure measuring apparatus.
Figure 3:
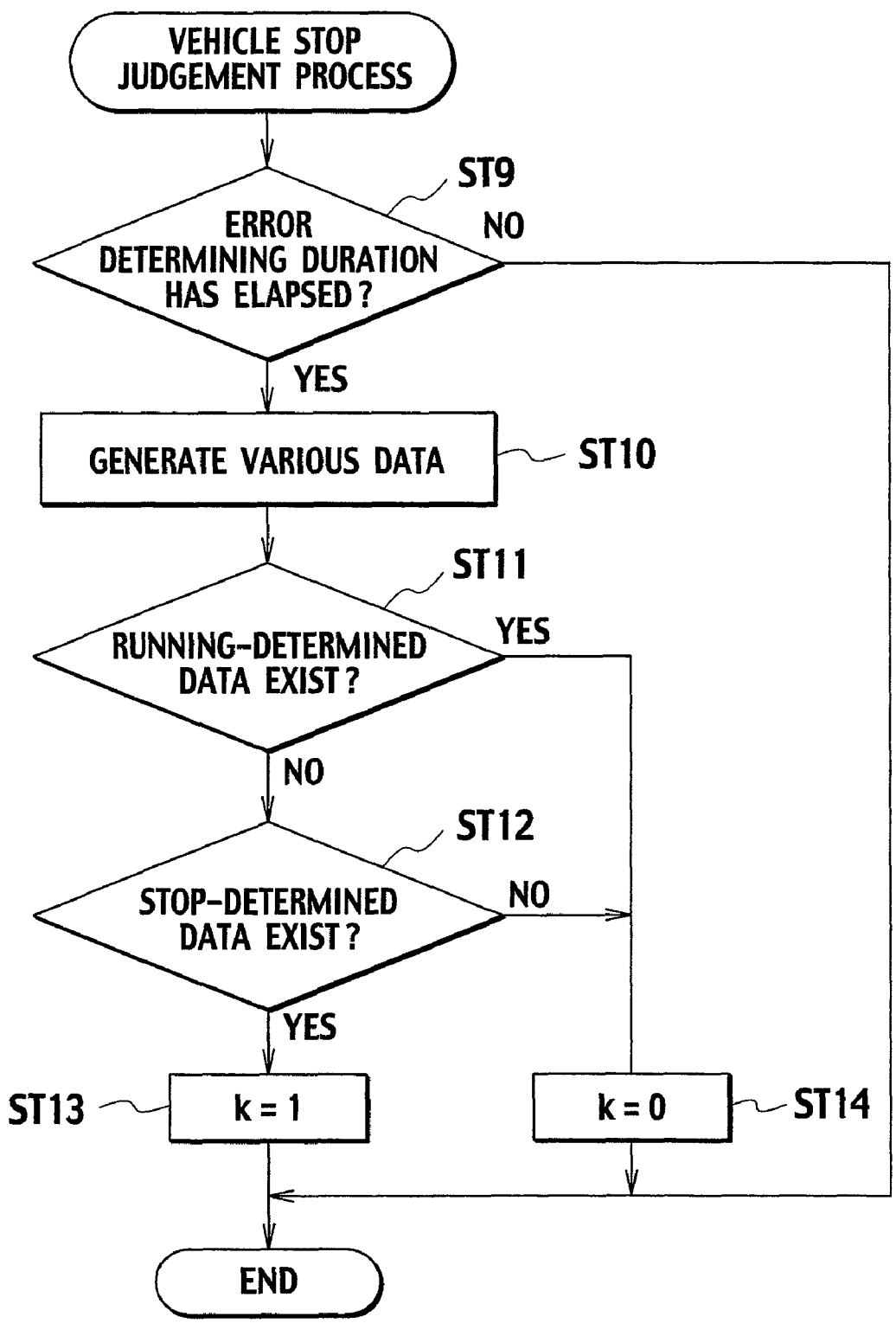
FIG. 3 is a flow-chart showing an example of process by the tire air pressure measuring apparatus.

The tire air pressure measuring apparatus repeatedly executes the air pressure data display process shown in FIG. 2, and also executes the vehicle-stop judgment process shown in FIG. 3 at a predetermined interrupt time intervals (for example, 1 (ms)). Note that the air pressure sensor modules 13 to 24 execute a process explained hereinafter while the air pressure data display process or the vehicle-stop judgment process is being executed. Specifically, the air pressure sensor modules 13 to 24 measure the air pressures of the tires 1 to 12 and generate the air pressure data signals of the measured air pressures. The air pressure sensor modules 13 to 24 generate identification data signals. The air pressure sensor modules 13 to 24 send the air pressure data signals and the identification data signals to the receivers 25 to 30.

To begin with, the air pressure data display process will be explained. In step ST1 shown in FIG. 2, the ECU38 clears memory areas in the RAM and set memory area for each of the segments in the RAM per the tires 1 to 12.

In step ST2, if any of the receivers 25 to 30 have received the air pressure data signal(s) and the identification data signal(s), the receiver(s) which has received the air pressure data signal(s) and the identification data signal(s) output the air pressure data signal(s) and the identification data signal(s) to the ECU 38. Then, the ECU 38 executes a process explained later. On the contrary, if none of the receivers 25 to 30 have received the air pressure data signal and the identification data signal, the ECU 38 forwards the process to step ST3.

In step ST2, the ECU 38 classifies the air pressure data signals into the segments set per the tires 1 to 12 based on the signals supplied from the receivers 25 to 30. The ECU 38 specifies the memory areas based on the segments to which the air pressure data signals belong. The ECU 38 stores contents of the air pressure data signals, i.e. the air pressure data in the specified memory areas, respectively.

The ECU 38 measures the received signal strength of the air pressure signals and generates the received signal strength data of the measured received signal strength. The ECU 38 stores the received signal strength data of the air pressure data signals in the specified memory areas, respectively. The ECU 38 recognizes the air pressures of the tires 1 to 12 based on the air pressure data stored in the memory areas and the segments to which the air pressure data belong, and displays the results of the recognition on the display unit 39.

In step ST3, the ECU 38 judges a condition, in which the error determining duration has elapsed since the current air pressure data display process had started. If this condition is met, the process proceeds to step ST4. If this condition is not met, the process returns to step ST2.

In step ST4, the ECU 38 judges a condition, in which an air pressure data signal belonging to any one of the segments is not supplied for the error determining duration (in other words, an air pressure data signal belonging to any one of the segments is not received by a receiver corresponding to the air pressure data signal for the error determining duration) based on the air pressure data stored in the memory areas in the RAM. If this condition is met, the process proceeds to step ST5. If this condition is not met, the air pressure data display process is terminated.

In step ST5, the ECU 38 judges a condition, in which the stop flag "k" is set to "1" (in other words, it is determined that the vehicle P stops). If this condition is met, the air pressure data display process is terminated. If this condition is not met (in other words, it is not determined that the vehicle P stops), the process proceeds to step ST6.

In step ST6, the ECU 38 specifies the segment(s) to which the air pressure data signal(s) has not been supplied for the error determining duration and displays an occurrence of an error in the air pressure sensor module corresponding to the specified segment on the display unit 39. Then, the ECU 38 terminates the air pressure data display process.

Therefore, only when it is not determined that the vehicle P stops and also an air pressure data signal belonging to any one of the segments is not received by a receiver corresponding to the air pressure data signal for the error determining duration, the ECU 38 provides the warning of the error of the air pressure sensor module corresponding to the one of the segments.

Next, the vehicle-stop judgment process will be explained. In step ST9 shown in FIG. 3, the ECU38 judges a condition, in which the error determining duration has elapsed since the air pressure data display process had started. If this condition is met, the process proceeds to step ST10. If this condition is not met, the vehicle-stop judgment process is terminated.

In step ST10, the ECU 38 generates judgment data for each of the segments based on the received signal strength data stored in the memory area in the RAM by executing a process explained hereinafter and stored them in the memory area in the RAM. Specifically, the ECU 38 generates stop-unknown data as the judgment data corresponding to a process-object segment when the number of the air pressure data of the process-object segment takes a value within a criteria range of air pressure data (for example, within 0 to 5), and stores it in the memory area corresponding to the process-object segment in the RAM. The stop-unknown data will be generated in case where enough data are not obtained to determine that the vehicle stops.

Figure 4:
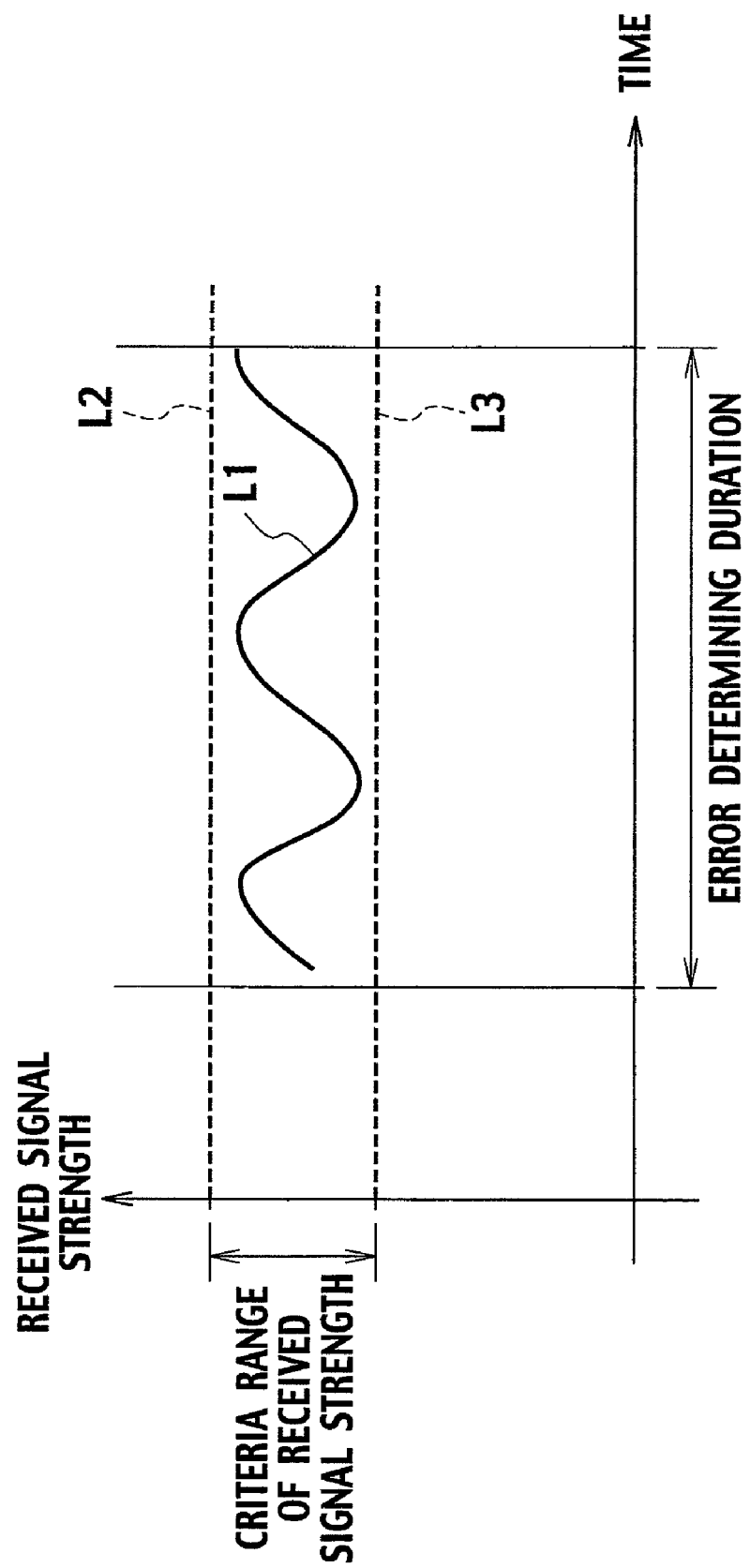
FIG. 4 is an explanatory diagram when it is determined that received signal strength is constant.

If the number of the air pressure data in the process-object segment goes beyond the criteria range of air pressure data, the ECU 38 calculates a difference between the maximum and minimum values (i.e. a value obtained by subtracting the minimum value from the maximum value) of the received signal strength data (here, the data take a value within 0 to 100) based on the received signal strength data in the process-object segment. The ECU 38 judges a condition (A), in which the calculated difference takes a value within a predetermined criteria range of received signal strength (for example, equal-to or smaller-than an arbitrary value within 5 to 10, such as "equal-to or smaller-than five" or "equal-to or smaller-than ten"). If the condition (A) is met, it is determined that the received signal strength data stay constant (in other word, hardly fluctuate) continuously for the error determining duration. Then, the ECU 38 generates stop-determined data as the judgment data corresponding to the process-object segment and stores it in the memory area corresponding to the process-object segment in the RAM. The stop-determined data will be generated in case where it can be determined that the vehicle P stops. Since a distance between the air pressure sensor module and the receiver stays constant when the vehicle P stops, the received signal strength data of the air pressure data signal also stay constant. An example of the case where the stop-determined data are generated is shown in FIG. 4. A curve line L1 indicates a relationship between the received signal strength and the time. Curve lines L2 and L3 indicate a general example of limit values to generate the stop-determined data. Specifically, the stop-determined data are generated when the curve line L1 stays within a range between the curve lines L2 and L3 continuously for the error determining duration. Note that the curve lines L2 and L3 are parallel with each other (width of the predetermined criteria range of received signal strength) and also parallel to a horizontal axis (i.e. axis of the time).

If the condition (A) is not met, the ECU 38 determines that the received signal strength data don't stay constant (in other word, fluctuates widely) continuously for the error determining duration. The ECU 38 generates running-determined data as the judgment data corresponding to the process-object segment and stores it in the memory area corresponding to the process-object segment. The running-determined data will be generated in case where it can be determined that the vehicle does not stop but is running. Since the distance between the air pressure sensor module and the receiver fluctuates widely when the vehicle P is running, the received signal strength data of the air pressure data signal also fluctuate widely.

In step ST11, the ECU 38 judges a condition, in which at least one of the segments has the running-determined data. If this condition is met, the process proceeds to step ST14. If this condition is not met, the process proceeds to step ST12.

In step ST12, the ECU 38 judges the vehicle-stop condition, in which the received signal strength data stay constant continuously for the error determining duration in the segments equal-to or more-than the predetermined segment criteria number (for example, five). Specifically, the ECU 38 judges a condition, in which the segments having the stop-determined data exist equal-to or more-than the predetermined segment criteria number. If this condition is met, the process proceeds to step ST13. If this condition is not met, the process proceeds to step ST14.

In step ST13, the ECU 38 determines that the vehicle P stops and sets the stop flag "k" to "1". Then, the ECU 38 terminates the vehicle-stop judgment process.

In step ST14, the ECU 38 doesn't determine that the vehicle P stops and sets the stop flag "k" to "0". Then, the ECU 38 terminates the vehicle-stop judgment process.

Therefore, the ECU 38 determines that the vehicle P stops only when the received signal strength data stay constant continuously for the error determining duration in the segments equal-to or more-than the predetermined segment criteria number.

Figure 5:
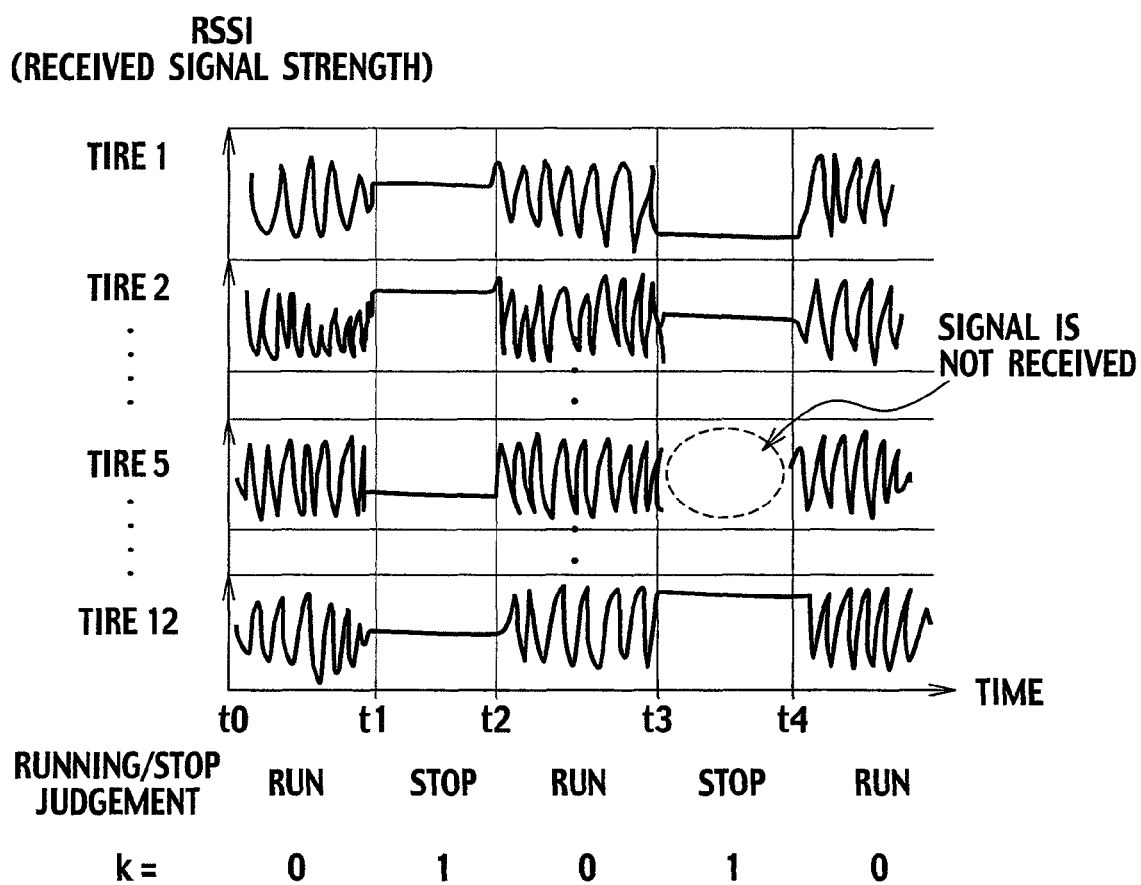
FIG. 5 is a timing chart showing a state where the received signal strength fluctuates.

Here, an example of distributions of the received signal strength is shown in FIG. 5. In FIG. 5, "TIRE 1", "TIRE 2" . . . indicate names of the segments. For example, the segment "TIRE 1" corresponds to the tire 1. A duration from time point t0 to time point t1 is longer than the error determining duration. The same holds for durations from time point t1 to time point t2, from time point t2 to time point t3 and from time point t3 to time point t4.

The ECU 38 generates the running-determined data for all of the segments in the durations from time point t0 to time point t1 and from time point t2 to time point t3. Therefore, the stop flag "k" is set to "0".

The ECU 38 generates the stop-determined data for all of the segments in the duration from time point t1 to time point t2. Therefore, the stop flag "k" is set to "1".

The ECU 38 generates the stop-unknown data for the segment "TIRE 5" and the stop-determined data for the other segments in the duration from time point t3 to time point t4. Therefore, the stop flag "k" is set to "1". Though the receiver 29 corresponding to the segment "TIRE 5" has not received the air pressure data continuously for the error determining duration, the warning of an error in the air pressure sensor module 17 corresponding to the tire 5 is not provided because the stop flag "k" is set to "1".

As explained above, in the tire air pressure measuring apparatus according to the first embodiment, only when it is not determined that the vehicle P stops (k=0) and also an air pressure data signal belonging to any one of the segments is not received by a receiver corresponding to the air pressure data signal for the error determining duration (the stop-unknown data are generated), provided is the warning of the error of the air pressure sensor module corresponding to the one of the segments. Therefore, in the tire air pressure measuring apparatus according to the first embodiment, since the warning is not provided when the vehicle stops for the error determining duration (k=1) even if the air pressure data signal(s) sent from the air pressure sensor module(s) is not transmitted to the receiver(s), a probability of a false warning can be reduced than ever before.

Furthermore, in the tire air pressure measuring apparatus according to the first embodiment, since the side brake 37 is not needed, the apparatus is manufactured more easily than the tire air pressure measuring apparatus according to a third embodiment explained later.

Furthermore, in the tire air pressure measuring apparatus according to the first embodiment, it is determined that the vehicle-stop condition is not met when exists the segment in which the received signal strength doesn't stay continuously for the error determining duration (see step ST11). Here, in case where the vehicle P has a spare tire and also an air pressure sensor module and a receiver corresponding to the spare tire exist, a distance between the air pressure sensor module and the receiver stays constant. Therefore, a received signal strength corresponding to the spare tire stays constant continuously for the error determining duration even when the vehicle P is running. Therefore, a false warning can be prevented in case where an air pressure sensor module and a receiver corresponding to a spare tire exist.

Furthermore, in the tire air pressure measuring apparatus according to the first embodiment, judged is the condition in which the received signal strength data stay constant continuously for the error determining duration, with focusing attention on the maximum and minimum values of the received signal strength data. As a result, a calculation amount for the judgment can be reduced more than that in a second embodiment explained later. Therefore, the tire air pressure measuring apparatus in the first embodiment can complete the judgment more easily and rapidly than that in the second embodiment.

Second Embodiment

Next, the second embodiment according to the present invention will be explained. The same holds in the second embodiment except that vehicle-stop judgment process is different from that in the first embodiment. Therefore, only the vehicle-stop judgment process will be explained with reference to a flow-chart shown in FIG. 6.

Figure 6:
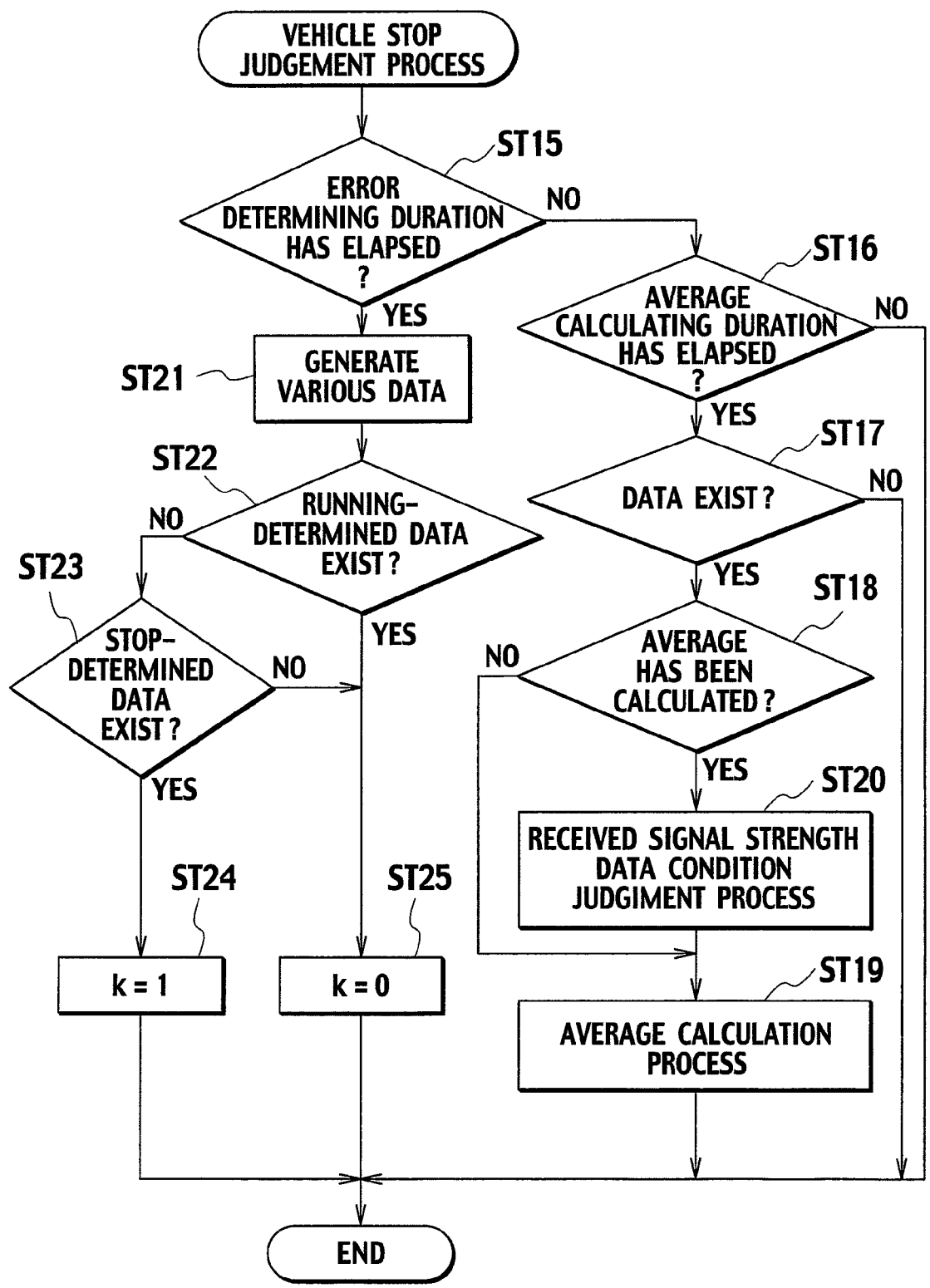
FIG. 6 is a flow-chart showing an example of process by the tire air pressure measuring apparatus.

In step S15 shown in FIG. 6, the ECU 38 judges a condition, in which the error determining duration has elapsed since the air pressure data display process had started. If this condition is met, the process proceeds to step ST21. If this condition is not met, the process proceeds to step ST16.

In step ST16, the ECU 38 judges a condition, in which a predetermined average calculating duration has elapsed since the air pressure data display process had started. If this condition is met, the process proceeds to step ST17. If this condition is not met, the vehicle-stop judgment process is terminated. Here, the average calculating duration is equal to or longer than the transmitting interval and shorter than the error determining duration. The average calculating duration may be 30 (min) for example.

In step ST17, the ECU 38 judges a condition, in which the received signal strength data, which are the latest received signal strength data and have not been used for average calculation process yet, are stored in the memory area for each of the segments. In respect to the segment for which this condition is met, the process proceeds to step ST18. In respect to the segment for which this condition is not met, the vehicle-stop judgment process is terminated.

In step ST18, the ECU 38 judges a condition, in which an average is already stored in the memory area for each of the segments. In respect to the segment for which this condition is met, the process proceeds to step ST20. In respect to the segment for which this condition is not met, the process proceeds to step ST19.

In step ST19, the ECU 38 executes average calculation process for each of the segments based on the received signal strength data stored in the memory area in the RAM. Specifically, the ECU 38 calculate an average of the received signal strength data which belong to the process-object segment and are obtained within a duration from the average calculating duration before the present to the present, and stores the calculated average data in the memory area corresponding to the process-object segment. Then, the ECU 38 terminates the vehicle-stop judgment process.

In step ST20, the ECU 38 executes received signal strength data condition judgment process for each of the segments based on the average data and the received signal strength data stored in the memory area in the RAM. Specifically, the ECU 38 calculates a difference between the current received signal strength data (i.e. the latest received signal strength data which have not been used for the average calculation process yet) and the latest (last) average data, both of which belong to the process-object segment. Then a received signal strength data condition, in which the calculated average takes a value within the criteria range of received signal strength, is judged. If the received signal strength data condition is met, the ECU 38 generates stop-determinable data, which indicate that stop-determined data may be generated, and stores it in the memory area corresponding to the process-object segment. If the received signal strength data condition is not met, the ECU 38 generates running-determinable data, which indicate that running-determined data may be generated, and stores it in the memory area corresponding to the process-object segment. Then, the ECU 38 forwards the process to step ST19.

Steps ST15 to ST20 will be briefly explained again. If the error determining duration has not elapsed (NO in step ST15) and also the average calculating duration has elapsed (YES in step ST16), it is judged whether or not exists the latest received signal strength data which have not yet used for calculating the average (step ST17). In other words, it is judged whether or not the average has been calculated using the latest received signal strength data. If the average has not been calculated using the latest received signal strength data (NO in step ST17), it is judged whether or not the average has been calculated using the previous received signal strength data (step ST18).

If the average has not been calculated using the previous received signal strength data (NO in step ST18), the average is calculated using the previous received signal strength data (step ST19). On the other hand, if the average has been calculated using the previous received signal strength data (YES in step ST18), the difference between the latest received signal strength data and the latest (last) average is calculated to judge the received signal strength data condition (step ST20). Then, the average is newly calculated using the latest received signal strength data (step ST19). Since the data used for calculating the average are the received signal strength data obtained within the duration from the average calculating duration before the present to the present, a moving average is to be sequentially calculated by steps ST15 to ST19 being repeated. Then, the received signal strength data condition is judged in step ST20 based on this moving averages and the latest received signal strength data, and then the stop-determinable data and the running-determinable data are to be sequentially accumulated.

In step ST21, the ECU 38 generates the judgment data for each of the segments based on the received signal strength data stored in the memory area in the RAM by executing a process explained hereinafter and stored it in the memory area in the RAM. Specifically, the ECU 38 generates the stop-unknown data as the judgment data corresponding to the process-object segment when the number by summing up the numbers of the stop-determinable data and the running-determinable data takes a value within a criteria range of sum number (for example, within 0 to 5), and stores it in the memory area corresponding to the process-object segment in the RAM. On the other hand, if the stop-unknown data are not generated, the ECU 38 executes a process explained hereinafter.

Figure 7:
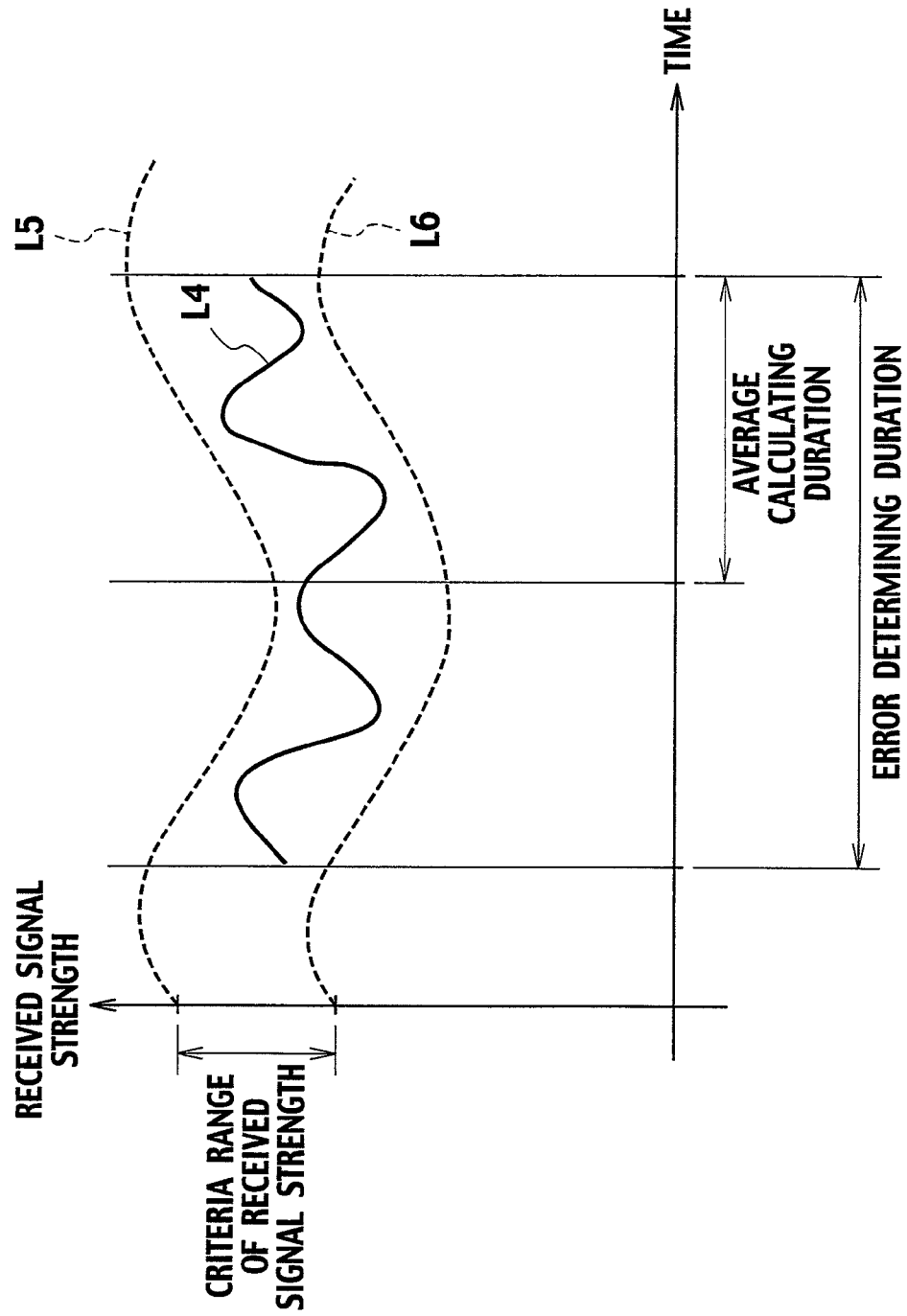
FIG. 7 is an explanatory diagram when it is determined that received signal strength is constant.

If only the stop-determinable data are stored in the memory area corresponding to the process-object segment (the received signal strength judgment condition had been met in all of the received signal strength data condition judgment processes had been executed for the process-object segment), the ECU 38 determined that the received signal strength data stay constant continuously for the error determining duration. In this case, the ECU 38 generates the stop-determined data as the judgment data corresponding to the process-object segment and stores it in the memory area corresponding to the process-object segment. Since a distance between the air pressure sensor module and the receiver stays constant when the vehicle P stops, the received signal strength data of the air pressure data signal also stay constant. An example of the case where the stop-determined data are generated is shown in FIG. 7. A curve line L4 indicates a relationship between the received signal strength and the time. Curve lines L5 and L6 indicate a general example of limit values to generate the stop-determined data. Specifically, the stop-determined data are generated when the curve line L4 stays within a range between the curve lines L5 and L6 continuously for the error determining duration. Note that the curve lines L5 and L6 are parallel with each other (width of the predetermined criteria range of received signal strength).

If the running-determinable data are stored at least once in the memory area corresponding to the process-object segment (the received signal strength data condition had not been met in any one of the received signal strength data condition judgment processes had been executed for the process-object segment), the ECU 38 determined that the received signal strength data don't stay constant continuously for the error determining duration. The ECU 38 generates the running-determined data as the judgment data corresponding to the process-object segment and stores it in the memory area corresponding to the process-object segment.

In step ST22, the ECU 38 judges a condition, in which at least one of the segments has the running-determined data exist at least once. If this condition is met, the process proceeds to step ST25. If this condition is not met, the process proceeds to step ST23.

In step ST23, the ECU 38 judges the vehicle-stop condition, in which the received signal strength data stay constant continuously for the error determining duration in the segments equal-to or more-than the predetermined segment criteria number. Specifically, the ECU 38 judges a condition, in which the segments having the stop-determined data exist equal-to or more-than the predetermined segment criteria number. If this condition is met, the process proceeds to step ST24. If this condition is not met, the process proceeds to step ST25.

In step ST24, the ECU 38 determines that the vehicle P stops and sets the stop flag "k" to "1". Then, the ECU 38 terminates the vehicle-stop judgment process.

In step ST25, the ECU 38 doesn't determine that the vehicle P stops and sets the stop flag "k" to "0". Then, the ECU 38 terminates the vehicle-stop judgment process.

Therefore, the ECU 38 determines that the vehicle P stops only when the received signal strength data stay constant continuously for the error determining duration in the segments equal-to or more-than the predetermined segment criteria number.

As explained above, the tire air pressure measuring apparatus in the second embodiment can bring the same advantages as that in the first embodiment. Furthermore, in the second embodiment, as shown in FIGS. 4 and 7, the range of the received signal strength data, within which the received signal strength can be determined to be constant continuously for the error determining duration, is wider than that in the first embodiment. Here, FIGS. 4 and 7 shows the fact that the received signal strength data may fluctuate even when the distance between the air pressure sensor module and the receiver is constant. This fluctuation may be caused by noises for example. Therefore, in the second embodiment, a probability of a false warning can be reduced more than that in the first embodiment.

Third Embodiment

Next, the third embodiment according to the present invention will be explained. The same holds in the third embodiment except that vehicle-stop judgment process is different from that in the first embodiment. Therefore, only the vehicle-stop judgment process will be explained with reference to a flow-chart shown in FIG. 8. Note that the side brake sensor 37 detects whether or not the side brake is being pulled during the vehicle-stop judgment process and continuously outputs a signal corresponding to the detection result to the ECU 38.

Figure 8:
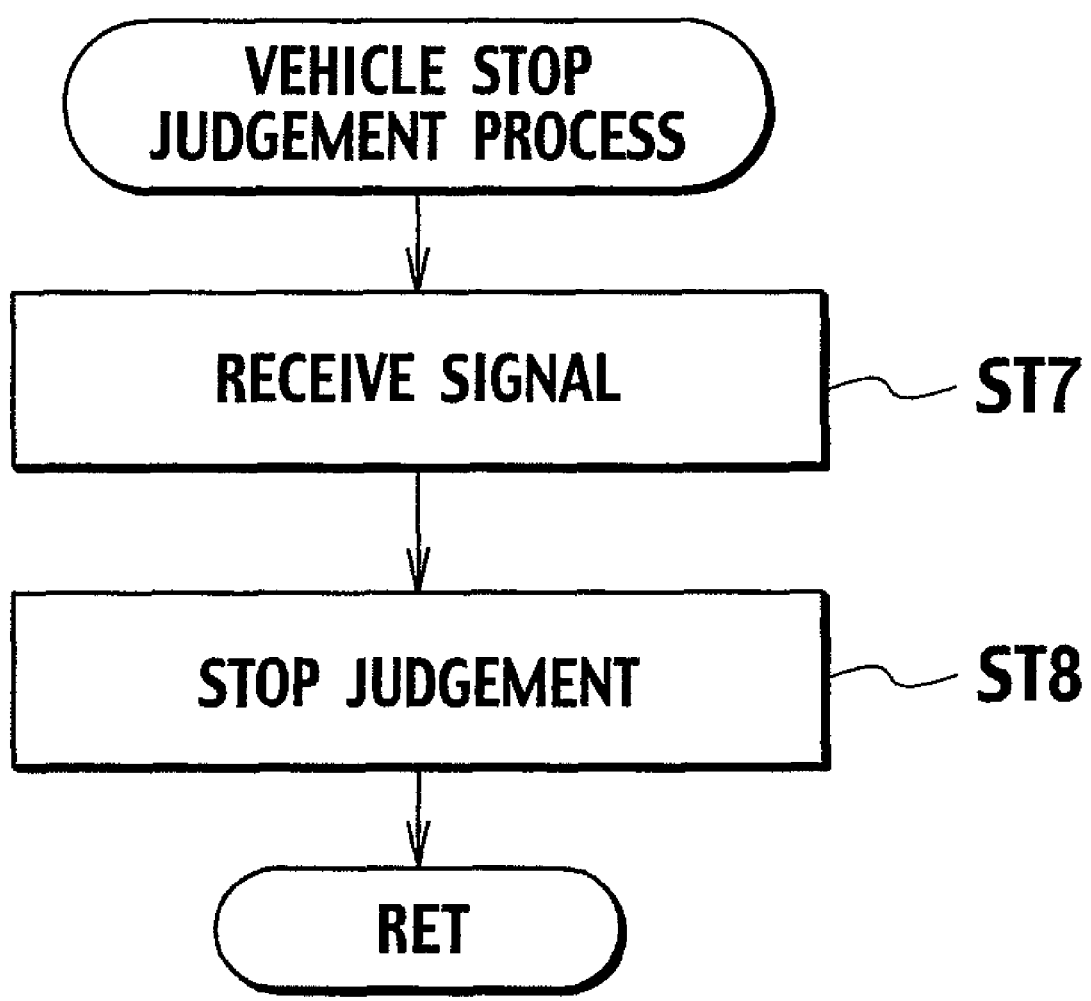
FIG. 8 is a flow-chart showing an example of process by the tire air pressure measuring apparatus.

In step S7 shown in FIG. 8, the ECU 38 receives the signal output from the side brake sensor 37 continuously for a predetermined vehicle-stop judgment duration (for example, 10 (sec.)).

In step S8, the ECU 38 judges a vehicle-stop condition, in which only a side-brake-on signal has been received continuously for the vehicle-stop judgment duration, based on the result of step ST7. The ECU 38 determined that the vehicle P stops only when the vehicle-stop condition is met. If the ECU 38 determined that the vehicle P stops, the ECU 38 sets the flag "k" to "1". If the ECU 38 doesn't determined that the vehicle P stops, the ECU 38 sets the flag "k" to "0". Then, the ECU 38 terminates the vehicle-stop judgment process.

As explained above, the tire air pressure measuring apparatus in the third embodiment can bring the same advantages as that in the first embodiment. Furthermore, in the third embodiment, since the vehicle-stop condition is judged based on the signal supplied from the side brake sensor 37, a calculation amount for the judgment can be reduced more than those in the first and second embodiments. Therefore, the tire air pressure measuring apparatus in the third embodiment can complete the judgment of the vehicle-stop condition more easily and rapidly than those in the first and second embodiments.

Note that the above-explained embodiments can be modified without departing from the principles of the invention. For example, the tire air pressure measuring apparatus may include an acceleration sensor and the ECU 38 may judge whether or not the vehicle P stops based on a signal supplied from the acceleration sensor. In this case, for example, the ECU 38 determined that the vehicle P stops when the acceleration of the vehicle stays within ±0.01 (G). The number of the receivers may be equal to the number of the air pressure sensor modules, or may be smaller than the number (i.e. six) in the first to third embodiments.

INDUSTRIAL APPLICABILITY

According to the invention of the present application, a warning of an error in a tire air pressure measuring unit(s) is provided only when it is not determined that a vehicle stops and also a receiver unit(s) has not received an air pressure data signal(s) for an error determining duration. Therefore, in the invention of the present application, since the warning is not provided if the vehicle stops continuously for the error determining duration under a situation where the air pressure data signal(s) sent by the tire air pressure measuring unit(s) can not be transmitted to the receiver unit(s), a probability of a false warning can be reduced than ever before.

The invention claimed is:

1. A tire air pressure measuring apparatus comprising:
   a tire air pressure measuring unit which rotates together with tires of a vehicle and sends an air pressure data signal on an air pressure of the tires at predetermined transmitting intervals;
   a receiver unit for receiving the air pressure data signal;
   a vehicle-stop judgment unit which generates a received signal strength data on a received signal strength of the air pressure data signal and which determines that the vehicle stops only when a predetermined vehicle-stop condition is met based on the received signal strength data; and
   a warning unit which provides a warning of an error of the tire air pressure measuring unit only when it is not determined that the vehicle stops and also the receiver unit has not received the air pressure data signal for an error determining duration which is longer than the transmitting interval,
   wherein the tire air pressure measuring unit and the receiver unit transmit the signals wirelessly,
   wherein the tire air pressure measuring unit is provided for each of the tires and sends an identification data signal for differentiating itself from other air pressure measuring units together with the air pressure data signal,
   wherein the receiver unit receives the identification data signal,
   wherein the vehicle-stop judgment unit classifies the air pressure data signal received by the receiver unit into each of segments provided for the tires based on the identification data signal received by the receiver unit, and generates the received signal strength data on the received signal strength of the air pressure data signal for each of the segments, and
   wherein the vehicle-stop condition is a condition in which the received signal strength data stay constant continuously for the error determining duration in respect to any one of the segments.

2. The tire air pressure measuring apparatus according to claim 1, wherein the vehicle-stop judgment unit:
   calculates a difference between maximum and minimum values of the received signal strength data for each of the segments based on the received signal strength data obtained during the error determining duration, and
   determines that the vehicle-stop condition is met only when the calculated difference of any one of the segments stays within a predetermined criteria range of received signal strength.

3. The tire air pressure measuring apparatus according to claim 1, wherein an average calculating duration, which is equal to or longer than the transmitting interval and shorter than the error determining duration, is set, and the vehicle-stop judgment unit:
   executes average calculation process and received signal strength data condition judgment process repeatedly during the error determining duration for each of the segments,
   in the average calculation process, the vehicle-stop judgment unit calculating an average of the received signal strength obtained within a duration from the average calculating duration before the present to the present, and
   in the received signal strength data condition judgment process, the vehicle-stop judgment unit calculating a difference between the average calculated in the last average calculation process and a current value of the received signal strength data, and judging received signal strength data condition in which the calculated difference stays within a predetermined criteria range of received signal strength, and
   determines that the vehicle-stop condition is met only when the received signal strength data condition has been met in the received signal strength data condition judgment process executed for any one of the segments.

4. The tire air pressure measuring apparatus according to claim 1, wherein
   the vehicle-stop judgment unit determines that the vehicle-stop condition is not met when one of the segments exists, for which the received signal strength data have not stayed constant continuously for the error determining duration.

* * * * *